United States Patent Office 3,562,209
Patented Feb. 9, 1971

---

3,562,209
ALPHA-OLEFIN POLYMERS CONTAINING POLYESTER STABILIZERS
Richard D. Cassar, West Chester, Pa., and Jackson S. Boyer, Claymont, Del., assignors to Sun Oil Company, Philadelphia, Pa., a corporation of New Jersey
No Drawing. Filed Mar. 10, 1969, Ser. No. 805,835
Int. Cl. C08f 45/58
U.S. Cl. 260—45.85     14 Claims

ABSTRACT OF THE DISCLOSURE

A solid substantially crystalline alpha-monoolefin polymer composition having improved resistance to ultraviolet degradation comprising a solid crystalline alpha-monoolefin polymer containing a polyester of a polymethylated muconic acid selected from the group consisting of $\alpha,\beta'$-dimethylmuconic acid, $\alpha,\alpha'$-dimethylmuconic acid, $\alpha,\alpha',\beta$-trimethylmuconic acid, $\alpha,\beta,\beta'$-trimethylmuconic acid, $\alpha,\alpha',\beta,\beta'$-tetramethylmuconic acid and mixtures thereof with a polyethylene glycol of a molecular weight in the range of 100 to 1000, said polyester having a molecular weight in the range of 600 to 20,000.

CROSS REFERENCES TO RELATED APPLICATIONS

The present application is related to applicants' following copending applications: Ser. No. 691,129 filed Dec. 18, 1967 entitled "Alpha-Olefin Polymers Having Improved Ultraviolet Stability" now U.S. Pat. No. 3,511,806; Ser. No. 691,153 filed Dec. 18, 1967 entitled "Ultraviolet Stabilized Petroleum Hydrocarbons"; Ser. No. 691,199 filed Dec. 18, 1967 entitled "Ultraviolet Stabilized Elastomeric Compositions"; Ser. No. 758,574 filed Sept. 9, 1968 entitled "Polymethylated Muconic Acids and Phosphite Ester Synergistic Stabilizer Combination for Elastomer Compositions"; Ser. No. 731,619 filed May 23, 1968 entitled "Stabilized Latex Emulsions"; and Ser. No. 777,476 filed Nov. 20, 1968 entitled "Plastic Surface Covering of Improved Ultraviolet Stability," each of which discloses ultraviolet stability improved compositions containing polymethylated muconic acids and their hydrocarbyl esters. The present application is also related to applicants' copending U.S. applications, Ser. No. 805,874 entitled "Elastomeric Composition Containing Polyester Stabilizers"; Ser. No. 805,871 entitled "Elastomeric Composition Containing Phosphite Ester and Polyester Stabilizers"; Ser. No. 805,872 entitled "Plastic Surface Covering of Improved Ultraviolet Light Stability"; and Ser. No. 805,819 entitled "Petroleum Hydrocarbons Containing Polyester Stabilizers," each of which is filed of even date herewith.

BACKGROUND OF THE INVENTION

The present invention relates to the improvement of ultraviolet stability of solid substantially crystalline alpha-monoolefin polymers. More particularly, this invention relates to novel crystalline alpha-olefin polymer compositions having improved ultraviolet stability, and to the method of preparing those compositions.

Recent developments in the science of alpha-monoolefin polymerization has provided a variety of new crystalline thermoplastic polymeric materials. These polymers generally have physical characteristics which render them most useful for many applications and thus commercially very attractive. These polymers can be molded or otherwise fabricated to form many useful articles. Unfortunately, alpha-monoolefin polymers are susceptible to degradation resulting from oxidation generally initiated by heat, mechanical working, and particularly by ultraviolet light. This degradation apparently can be caused by free radical formation in the polymer composition initiated by ultraviolet light and promoted by oxygen and impurities in the polymer such as metals and metallic salts. The free radicals which are formed apparently undergo chemical reaction with the polymer itself resulting in undesirable chemical and physical transformation. This transformation is normally first recognized in the form of discoloration such as yellowing of the polymer. More extreme degradation results in premature deterioration of the polymer in the form of loss of tensile strength, pliability, impact strength, and in some cases, loss of surface gloss.

One effective method of reducing ultraviolet initiated degradation of solid crystalline alpha-monoolefin polymers consists of adding an ultraviolet stabilizing compound to the polymer composition.

DESCRIPTION

It has now been discovered that a blend of alpha-olefin polymers and new polyesters derived from certain polymethylated muconic acids or their $C_1$ to $C_{20}$ hydrocarbyl esters copolymerized with polyethylene glycols provide an alpha-olefin polymer composition having improved resistance to ultraviolet initiated degradation.

The ultraviolet stability improving additives found to be suitable for use in the compositions of the present invention are polyesters of polymethylated muconic acids with a polyethylene glycol having molecular weight in the range of 100 to 1000. The polyesters are characterized as being normally liquid at room temperature and having a molecular weight in the range of 600 to 20,000. The ultraviolet stability improving additive is preferably present in the alpha-olefin polymer compositions of the present invention in the quantity of 0.1 to 20.0 weight percent based on the weight of the whole composition. The more preferred concentration of ultraviolet stability improving additive is 2.0 to 10.0 weight percent based on the weight of the whole composition.

Polymethylated muconic acids that can be used in preparing polyesters suitable for use in the compositions of the present invention include the cis-cis, cis-trans and trans-trans isomers of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid, $\alpha,\alpha',\beta,\beta'$-tetramethylmuconic acid and their monoesters wherein one carboxyl group is attached to a $C_1$ to $C_{20}$ hydrocarbyl radical, or their diesters wherein each carboxyl group is attached to a $C_1$ to $C_{20}$ hydrocarbyl radical, and mixtures thereof.

The $C_1$ to $C_{20}$ hydrocarbyl esters included in the present invention are selected from the hydrocarbyl radicals of $C_1$ to $C_{20}$ hydrocarbons having acyclic, cyclic, and aromatic structures such as those disclosed in the text "Handbook of Hydrocarbons," S. W. Ferris, Academic Press, Inc., New York, N.Y. (1955), pp. 145–249, all of which are incorporated herein by reference. The preferred esters of the present invention are the $C_1$ to $C_{10}$ hydrocarbyl mono- and di-esters of the polymethylated muconic acids disclosed above. Examples of the $C_1$ to $C_{10}$ hydrocarbyl groups include methyl, ethyl, butyl, pentyl, hexyl, heptyl, octyl, nonyl, decyl cyclopentyl, methyl cyclopentyl, dicyclopentyl, cyclohexyl, phenyl, tolyl, xylyl, naphthyl, tetrahydronaphthyl, decahydronaphthyl, as well as the various isomers of each.

The diester of the muconic acid can be mixed ester. An illustrative example is the cis-cis isomer of $\alpha,\alpha'$-dimethylmuconic acid which can be illustrated by the following structural formula:

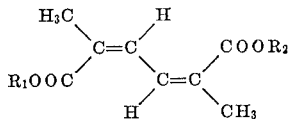

wherein $R_1$ is different from $R_2$. That is to say, $R_1$ can be a hydrocarbyl group of $C_1$ to $C_{20}$ and $R_2$ can be a different hydrocarbyl group of $C_1$ to $C_{20}$, e.g., $R_1$ equals cyclohexyl ($C_6$) and $R_2$ equals eicosyl ($C_{20}$).

Examples of some of the esters of the polymethylated muconic acids suitable for use in the compositions of the present invention include the cis-cis, cis-trans and trans-trans isomers of the mono- and di-methyl esters of $\alpha,\beta'$-dimethylmuconic acid; the mono- and di-phenyl esters of $\alpha,\alpha',\beta,\beta'$-tetramethylmuconic acid; the mono- and dinaphthyl esters of $\alpha,\beta,\beta'$-trimethylmuconic acid; the mono- and di-5,6-diethylacenaphthyl esters of $\alpha,\alpha'$-dimethylmuconic acid; the mono- and di-cyclohexyl ester of $\alpha,\alpha'$-dimethylmuconic acid; the mono- and di-1,2-dimethylcycloheptyl esters of $\alpha,\beta'$-dimethylmuconic acid; the mono- and di-decahydronaphthyl esters of $\alpha,\alpha',\beta,\beta'$-tetramethylmuconic acid; the mono- and di-1,3-dipropylbenzyl esters of $\alpha,\alpha'$-dimethylmuconic acid; the mono- and di-2,9-dimethyl-4,7-diisobutyldecyl esters of $\alpha,\alpha',\beta$-trimethylmuconic acid; and the mono- and di-anthracyl esters of $\alpha,\beta'$-dimethylmuconic acid; mono- and di-2,6,10-trimethyl decyl esters of $\alpha,\alpha',\beta,\beta'$-tetramethylmuconic acid; and the nonyl ethyl esters of $\alpha,\alpha',\beta$-tetramethylmuconic acid.

As noted above, polymethylated muconic acids can exist in three isomeric forms, viz cis-cis, trans-trans and cis-trans. As an example, the unsaturated diacid, $\alpha,\alpha'$-dimethylmuconic acid, can be depicted by the following structural formulas:

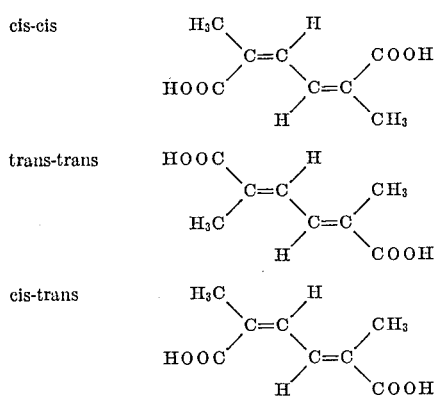

The preparation of each of these isomeric forms of the $\alpha,\alpha'$-dimethylmuconic acid has been described in the prior art by Elvidge et al., J. Chem. Soc., pp. 1026–1033 (1952). These authors show that oxidation of p-xylenol by means of peracetic acid gave the cis-cis form of the acid. The other isomeric forms were obtained indirectly by conversion of the cis-cis form. Also dimethyl esters of each of the three isomeric forms were prepared by shaking the respective DMMA with ethereal diazomethane.

The cis-cis form of polymethylated muconic acids can also be obtained by biological oxidation of p-xylene utilizing special strains of microorganisms as disclosed in U.S. Pat. No. 3,383,289 issued May 14, 1968 of Raymond et al.

Procedures for recovering esters of the three isomeric forms of methylated muconic acids usable in the compositions of the present invention are also disclosed in United States application, Ser. No. 561,736 filed June 30, 1966, now U.S. Pat. No. 3,440,158 issued Apr. 28, 1969.

Polyethylene glycols suitable for use in preparing the polyester stabilizers of the present invention are generally represented by the structural formula:

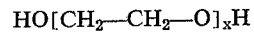

where $x$ equals any value in the range of 2 to 22. These polyethylene glycols are normally liquid at 25° C. and have a molecular weight in the range of 100 to 1000. Polyethylene glycols are well known standard articles of commerce. One method of preparing polyethylene glycols is disclosed in the text "Chemistry of Organic Compounds," Noller, Carl R., 2nd edition, W. B. Saunders Co., Philadelphia, Pa. (1958), p. 742. One method of preparing the polyesters herein disclosed is provided in U.S. Pat. No. 3,429,949 issued Feb. 25, 1969 to Gary L. Driscoll. Also examples of polyester compositions suitable for use in the elastomeric compositions of the present invention and methods of their preparation are disclosed in United States patent application Ser. No. 805,818 by Gary L. Driscoll filed of even date herewith.

The solid crystalline alpha-monoolefin polymers of the compositions of the present invention are those polymers recovered from the sterospecific polymerization of alpha-monoolefins such as $C_2$ to $C_8$ olefins, including ethylene, propylene, butene-1, pentene-1, hexene-1, 4-methylpentene-1, and mixtures thereof. These monomers can be polymerized to high molecular weight polymers by the procedure and catalysts disclosed in United States Pat. Nos. 2,827,446; 2,996,491; 2,996,493; 3,055,878; 3,061,601; and 3,099,647; and Belgian Pat. Nos. 533,362; 534,792 and 534,888 and others. In the polymerization process, the insoluble polymer precipitates from liquid components of the reaction medium in the form of finely divided particles. Also, a small amount of the polymer product, which is substantially amorphous and soluble in the inert polymerization solvent, is produced. In the process of separating the insoluble polymer powder from the polymerization liquid, e.g., by centrifuging, most of the soluble polymer is separated from the insoluble powder and is carried off with the polymerization liquid.

The insoluble powder is then recovered in the form of a white finely divided powder which can be molded into solid articles. It is this solid crystalline alpha-monoolefin polymer to which the ultraviolet stabilizer can be added to provide a polymer having improved ultraviolet stability.

The stability improving polyesters of the compositions of the present invention can be incorporated into the polymer by simply adding the desired amount of the additive to the polymer in a finely divided form and agitating the blend until a fairly homogeneous mixture is obtained. The blend is thereafter melted and extruded to provide the finished composition. Any of the many other procedures of incorporating additives into crystalline polymer powder well known to those skilled in the art can also be utilized in the practice of the methods and compositions of the present invention.

After the polymer is stabilized in accordance with the present invention, it is thereafter normally melted and extruded into the desired form. Generally, usable forms include pellets, fibers, films, and solid injection molded or blow molded articles.

As one means of illustrating the present invention, the following examples are presented:

EXAMPLE I

Propylene monomer was polymerized in a glass-lined autoclave at a temperature of about 70° C. at 60 p.s.i.g. pressure. The polymerization was effected by dissolving the propylene in hexane in the presence of a catalyst complex consisting of titanium trichloride and diethylaluminum chloride.

A hexane insoluble white finely divided solid crystalline polypropylene powder having a melting point of about 165° C. was recovered as a product of the polymerization. A sample of this polymer was compression molded at a pressure of 4000 p.s.i. at a temperature of 450° F. into a plaque measuring 4" x 4" x 1/8".

EXAMPLE II

A polyester of the dimethyl ester of trans-trans $\alpha,\alpha'$-dimethylmuconic acid was prepared as follows:

A solution of 1500 g. of cis-cis dimethylmuconic acid obtained by biological oxidation of p-xylene and dissolved in 10 liters of 6 N NaOH is refluxed for 24 hours, diluted with 5 volumes of distilled water, and brought to pH 3 with 12 N HCl. The solid which separates at this point is filtered off and dried; it contains about 80% of the trans-trans acid, with a lesser amount of cis-trans acid and a minor amount of the cis-cis acid.

The crude product thus obtained is esterified by refluxing it (1400 g.) in 10 liters of methanol containing 10 cc. of concentrated $H_2SO_4$ until solution occurs. Cooling the reaction mixture yields the dimethyl ester of the trans-trans acid in substantially pure form (M.P. 102°–104° C.).

582 grams of dimethyl $\alpha,\alpha'$-dimethyl, trans-trans muconate, 1170 grams of polyethylene glycol having an average molecular weight of about 300 were blended and heated in a glass polymerization vessel under a nitrogen atmosphere until the entire blend becomes molten. The melt was thereafter maintained at 200° C. while 4.0 cc. of tetraisopropyl titanate catalyst was added and maintained at that temperature for 12 hours under continuous agitation. The resultant liquid product was vacuum distilled at 1 mm. hg. pressure for 3 hours. The residue recovered comprised 1500 grams of a thick viscous polyester liquid.

The viscous liquid polyester prepared as disclosed hereinabove had a Brookfield Viscosity of 1670 centipoises using a #4 spindle at 60 r.p.m.

EXAMPLE III

Two hundred grams of polypropylene powder identical to the polymer disclosed in Example I was blended with 1.0 grams of the polyester described in Example II. The polypropylene composition was subsequently compression molded in the identical manner as disclosed for Example I.

EXAMPLE IV

Two hundred grams of polypropylene powder identical to the polymer disclosed in Example I were blended with 5.0 grams of the polyester described in Example II. The polypropylene composition was subsequently compression molded in the identical manner as disclosed for Example I.

EXAMPLE V

Two hundred grams of polypropylene powder identical to the polymer disclosed in Example I were blended with 10.0 grams of polyester described in Example II. The polypropylene composition was subsequently compression molded in the identical manner as disclosed for Example I.

Each plaque made from the polypropylene compositions disclosed in the examples above was exposed to ultraviolet light for a period of at least 72 hours in accordance with procedures outlined in ASTM D925–55. After each 24-hour period of exposure, each plaque was visually examined for discoloration. The results of these examinations appear in the table below.

TABLE

| Hours of exposure to U.V. light | Example I | Example III | Example IV | Example V |
|---|---|---|---|---|
| 24 | Slight | None | None | None. |
| 48 | Medium | do | do | Do. |
| 72 | Heavy | do | do | Do. |

One direct noticeable result of exposure of crystalline alpha-olefin polymers to ultraviolet light is the appearance of yellow discoloration in the plaque. This yellowing in the polymer is a result of ultraviolet initiated degradation and can therefore be related directly to the ultraviolet stability of the polymer composition. The greater the intensity of yellowness in the polymer, the greater the amount of ultraviolet degradation that has taken place in the polymer.

The data given in the table above illustrate an improved ultraviolet stability of polypropylene containing a polyester prepared from polyethylene glycol copolymerized with the dimethyl ester of trans-trans $\alpha,\alpha'$-dimethylmuconic acid. This fact is easily recognized by comparing the results of the effects of U.V. exposure on the compositions of Examples III–V with the unstabilized polymer of Example I.

The above comparison illustrates the ultraviolet stability achieved with natural colored polypropylene. However, any of the solid crystalline alpha-monoolefin polymers herein disclosed containing any of the many well known additives normally used with these compositions are usable in the present invention.

Ultraviolet stability improving polyester suitable for use in the compositions of this invention can be prepared with polymethylated muconic acids other than dimethyl ester of trans-trans $\alpha,\alpha'$-dimethylmuconic acid set forth in the examples given above and can be substituted therefore in any of the alpha-olefin polymers disclosed and provide analogous results. Included among polymethylated muconic acids, are the cis-cis, cis-trans and trans-trans isomers of any of the polymethylated muconic acids disclosed above as well as these isomers of the monoesters of each of these acids wherein the ester is a $C_1$ to $C_{20}$ hydrocarbyl group and also the diesters of each of these acids wherein each ester is a $C_1$ to $C_{20}$ hydrocarbyl group. Any combination of the above additives with any of the disclosed alpha-olefin polymers provide results analogous to those disclosed in the examples given above.

Also, any of the solid substantially crystalline alpha-olefin polymers other than the polypropylene disclosed above can be substituted therefore with substantially analogous results being obtained.

The invention claimed is:

1. A solid substantially crystalline alpha-monoolefin polymer composition having improved resistance to ultraviolet degradation comprising said polymer containing an ultraviolet stability improving quantity of a polyester of a polymethylated muconic acid selected from the group consisting of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid, $\alpha,\alpha',\beta,\beta'$-tetramethylmuconic acid and mixtures thereof with a polyethylene glycol having a molecular weight in the range of 100 to 1000 said polyester having a molecular weight in the range of 600 to 20,000.

2. A composition according to claim 1 wherein the polymer is polypropylene.

3. A composition according to claim 2 wherein the ultraviolet stability improving polyester is derived from cis-cis isomer of said polymethylated muconic acids.

4. A composition according to claim 3 wherein the quantity of ultraviolet stability improving material is in the range of 2 to 10 weight percent.

5. A composition according to claim 4 wherein said polymethylated muconic acid is $\alpha,\alpha'$-dimethylmuconic acid.

6. A composition according to claim 2 wherein the ultraviolet stability improving polyester is derived from the cis-trans isomer of said polymethylated muconic acids.

7. A composition according to claim 6 wherein the quantity of ultraviolet stability improving material is in the range of 2 to 10 weight percent.

8. A composition according to claim 7 wherein said polymethylated muconic acid is α,α'-dimethylmuconic acid.

9. A composition according to claim 2 wherein the ultraviolet stability improving polyester is derived from the trans-trans isomer of said polymethylated muconic acids.

10. A composition according to claim 9 wherein the quantity of ultraviolet stability improving material is in the range of 2 to 10 weight percent.

11. A composition according to claim 10 wherein said polymethylated muconic acid is α,α'-dimethylmuconic acid.

12. A composition according to claim 1 wherein the alpha-olefin polymer is polyethylene.

13. A composition according to claim 12 wherein the quantity of the ultraviolet stability improving material is in the range of 2 to 10 weight percent.

14. A composition according to claim 13 wherein said polymethylated muconic acid is α,α'-dimethylmuconic acid.

References Cited

UNITED STATES PATENTS 3,313,770   4/1967   Foster _____ 260—45.75

M. J. WELSH, Primary Examiner

V. P. HOKE, Assistant Examiner

U.S. Cl. X.R.

260—873